United States Patent [19]
Furness et al.

[11] Patent Number: 5,564,869
[45] Date of Patent: Oct. 15, 1996

[54] METHOD OF DRILLING DUCTILE MATERIALS

[75] Inventors: Richard J. Furness, St. Clair Shores; William R. Lander, Williamston, both of Mich.

[73] Assignee: Ford Motor Company, Dearborn, Mich.

[21] Appl. No.: 378,296

[22] Filed: Jan. 25, 1995

[51] Int. Cl.$^6$ ............................................. B23B 35/00
[52] U.S. Cl. .............................................. 408/1 R; 408/17
[58] Field of Search .................................. 408/1 R, 17

[56] References Cited

U.S. PATENT DOCUMENTS

| | | |
|---|---|---|
| 2,669,889 | 2/1954 | Huller . |
| 2,989,046 | 6/1961 | Zimmerman . |
| 4,269,549 | 5/1981 | Block . |
| 4,480,952 | 11/1984 | Jeremias . |
| 5,139,376 | 8/1992 | Pumphrey . |
| 5,158,405 | 10/1992 | Serafin . |
| 5,247,862 | 9/1993 | Haack . |

FOREIGN PATENT DOCUMENTS

| | | | |
|---|---|---|---|
| 193107 | 8/1989 | Japan | 408/1 R |
| 310803 | 12/1989 | Japan | 408/1 R |
| 106407 | 4/1994 | Japan | 408/1 R |
| 588072 | 1/1978 | U.S.S.R. | 408/1 R |

*Primary Examiner*—Daniel W. Howell
*Attorney, Agent, or Firm*—Joseph W. Mallec, Esq.; Roger L. May, Esq.

[57] ABSTRACT

A method of drilling ductile materials with split-point drills includes the steps of placing a split-point drill above a ductile material having an entrance side, drilling a hole in the ductile material with the split-point drill from the entrance side to an exit side thereof, breaking through a surface of the exit side with the split-point drill a first predetermined distance to form a drill cap, retracting the split-point drill a second predetermined distance, and accelerating the split-point drill through the surface of the exit side to remove the drill cap from the ductile material.

9 Claims, 2 Drawing Sheets

METHOD OF DRILLING DUCTILE MATERIALS

BACKGROUND OF THE INVENTION

1. Field of the Invention

The present invention relates generally to methods for drilling and, more specifically, to a method of drilling holes in ductile materials.

2. Description Of the Related Art

It is known to use split-point drills for drilling holes in ductile materials. These split-point drills are commonly used on workpieces of ductile material such as low carbon steel. In conventional drilling, a feedrate of the split-point drill is constant throughout a full drill stroke, followed by a rapid feedrate velocity retraction of the split-point drill. During conventional drilling, material immediately beneath a point of the split-point drill undergoes severe plastic deformation resembling an extrusion process. As the split-point drill nears an exit side of the workpiece, the remaining material is unable to support the cutting forces of the drill and begins to form a mushroom which bulges from the exit side of the workpiece as the drilling operation proceeds. Under conventional drilling, this propagating mushroom becomes a drill cap that is retained on the exit side of the workpiece. Drill caps are thin sections of material which resemble the shape of the drill point. A small push-out burr, in the shape of a cylindrical extrusion, is also created around the perimeter of the drilled hole. As the split-point drill exits the workpiece, the drill cap folds over and hinges along an edge of the drilled hole on the exit side.

Although the above method of drilling has worked well on ductile materials, it suffers from the disadvantage that the drill caps present a difficult challenge for automated deburring. The drill cap often folds back into the drilled hole in conventional mechanical deburring processes (wire brush, vibratory). As a result, the drill cap contaminates deburring media in abrasive flow processes, and its shape and attachment to the workpiece renders other techniques ineffective (e.g., electrolytic).

SUMMARY OF THE INVENTION

Accordingly, the present invention is a method of drilling ductile materials with split-point drills including the step of placing a split-point drill above a ductile material having an entrance side. The method also includes the step of drilling a hole in the ductile material with the split-point drill from the entrance side to an exit side thereof and breaking through a surface of the exit side with the split-point drill a first predetermined distance to form a drill cap. The method further includes the step of retracting the split-point drill a second predetermined distance and accelerating the split-point drill through the surface of the exit side to remove the drill cap from the ductile material.

One advantage of the present invention is that a method is provided for drilling holes in ductile materials. Another advantage of the present invention is that the method effectively eliminates drill cap retention on the workpiece when using split-point drills. Yet another advantage of the present invention is that the method eliminates drill cap retention to allow for automated deburring of the drilled hole. Still another advantage of the present invention is.that the method does not adversely affect tool life when compared to conventional drilling.

Other features and advantages of the present invention will be readily appreciated as the same becomes better understood after reading the subsequent description taken in light of the accompanying drawings.

DESCRIPTION OF THE PREFERRED EMBODIMENT(S)

Figure 1A:
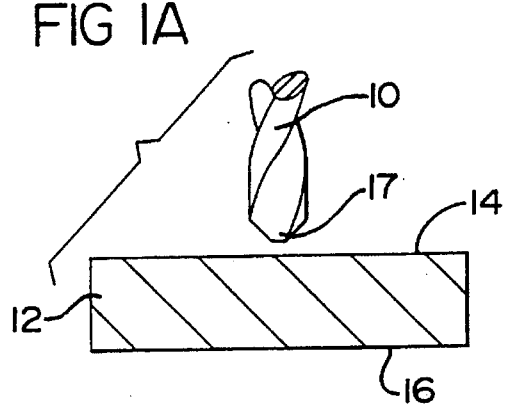
FIGS. 1A, 1B, 1C, 1D, 1E, and 1F are fragmentary elevational views illustrating progressive steps of a method of drilling ductile materials according to the present invention.

Referring to the drawings and, in particular to FIG. 1A, a method of drilling holes in ductile materials with split-point drills, according to the present invention, is shown. The method includes the step of placing a split-point drill 10 above a ductile material 12 such as a low carbon steel. The ductile material 12 has an entrance side 14 and an opposed exit side 16. The split-point drill 10 has a drill point 17 to engage the ductile material 12. It should be appreciated that the split-point drill 10 is operatively connected to a spindle (not shown) of a drilling apparatus (not shown) as is known in the art.

Figure 1D:
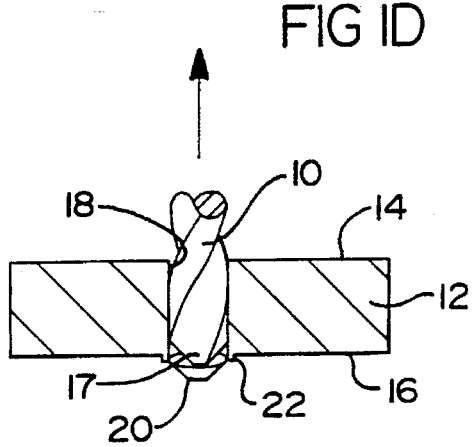
Figure 1B:
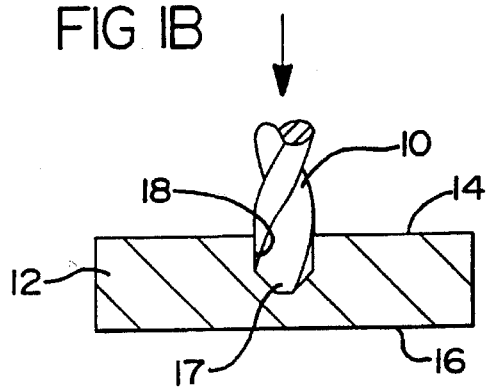

As illustrated in FIG. 1B, the method includes the step of drilling a hole 18 in the ductile material 12 with the split-point drill 10 from the entrance side 14 to the exit side 16. The split-point drill 10 is moved at a constant feedrate and spindle speed by the drilling apparatus. It should be appreciated that the split-point drill 10 is illustrated in mid-stroke.

Figure 1E:
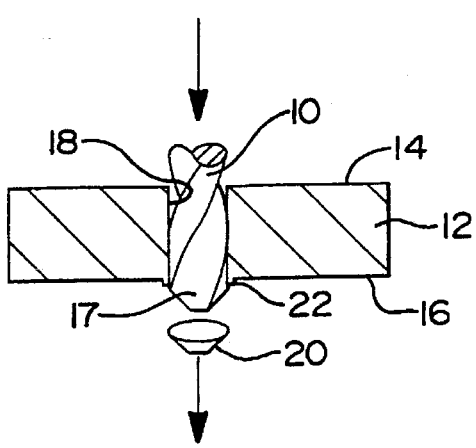
Figure 1C:
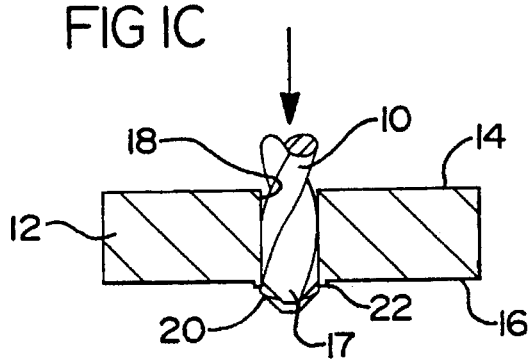

As illustrated in FIG. 1C, the method includes the step of partially breaking through a surface of the exit side 16 with the drill point 17 of the split-point drill 10 a first predetermined distance such as approximately 0.010 inches to form a drill cap 20. The drill cap 20 is a thin section of the ductile material 12 which resembles the shape of the drill point 17. The split-point drill 10 also forms a small push-out burr 22, in the shape of a cylindrical extrusion, around the perimeter of the hole 18 on the exit side 16. It should be appreciated that the hole 18 is drilled under conventional conditions (e.g., constant drilling feedrate such as eight (8) inches per minute) until margins of the split-point drill are within 0.010 inches of the surface of the exit side 16.

Figure 1F:
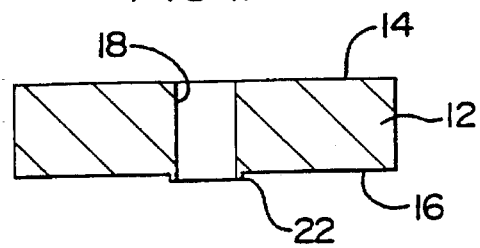
Figure 2:
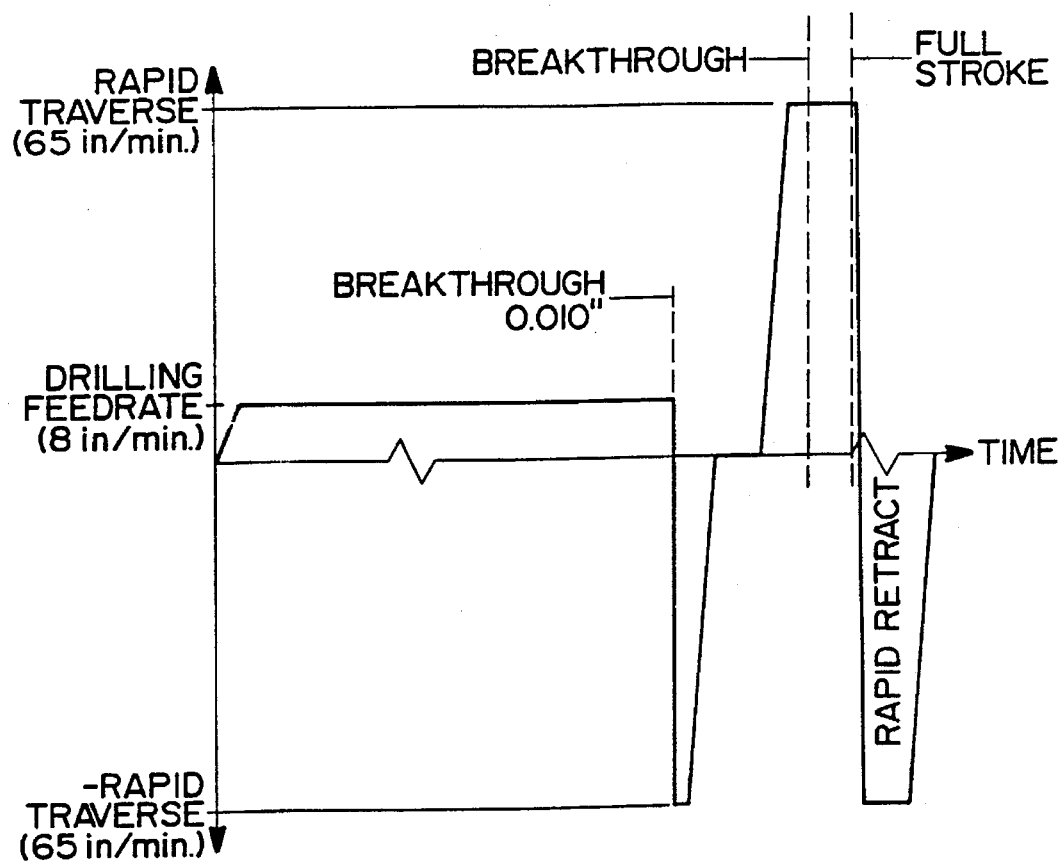
FIG. 2 is a graph of a feedrate profile for the method of FIGS. 1A through 1F.

Referring to FIG. 1D, the method includes the step of retracting the split-point drill 10 a predetermined distance such as approximately 0.010 inches before the drill point 17 fully breaks through the surface of the exit side 16. This step uses a rapid feedrate such as sixty-five (65) inches per minute to traverse the split-point drill 10. As illustrated in FIG. 1E, the method includes the step of accelerating the split-point drill 10 through the surface of the exit side 16 to remove the drill cap 20 from the ductile material 12. This step also uses a rapid feedrate velocity such as sixty-five (65) inches per minute to traverse the split-point drill 10 through the exit side 16. As illustrated in FIG. 1F, the method includes the step of retracting the split-point drill 10 from the hole 18 of the ductile material 12 leaving only the push-out burr 22 around the perimeter of the hole 18. This step again uses a rapid feedrate velocity such as sixty-five (65) inches per minute to traverse the split-point drill 10 from the hole 18. It should be appreciated that these methods resemble a combination of drilling and punching. The method uses the above feedrates in a profile to cause the drill cap 20 to shear from the exit side 16 of the ductile material 12 as illustrated in FIG. 2.

Accordingly, the method, according to the present invention, effectively eliminates retention of the drill cap 20 on the ductile material 12 for through-hole drilling operations utilizing split-point drills 10. The method allows for automated deburring of the hole 18.

The present invention has been described in an illustrative manner. It is to be understood that the terminology which has been used is intended to be in the nature of words of description rather than of limitation.

Many variations and modifications of the present invention are possible in light of the above teachings. Therefore, within the scope of the appended claims, the present invention may be practiced otherwise than as specifically described.

What is claimed:

1. A method of drilling ductile materials with split-point drills, said method comprising the steps of:

placing a split-point drill above a ductile material having an entrance side;

drilling a hole in the ductile material with the split-point drill from the entrance side to an exit side thereof;

breaking through a surface of the exit side with the split-point drill a first predetermined distance to form a drill cap;

retracting the split-point drill a second predetermined distance; and accelerating the split-point drill through the surface of the exit side to remove the drill cap from the ductile material.

2. A method as set forth in claim 1 including the step of retracting the split-point drill from the ductile material after said step of accelerating.

3. A method as set forth in claim 1 wherein said step of breaking comprises partially breaking through the surface of the exit side with a drill point of the split-point drill approximately 0.010 inches.

4. A method as set forth in claim 1 wherein said step of retracting comprises retracting the splitpoint drill approximately 0.010 inches.

5. A method as set forth in claim 1 wherein said step of drilling comprises drilling a hole through the ductile material at a constant feedrate.

6. A method of drilling ductile materials with split-point drills, said method comprising the steps of:

placing a split-point drill above a ductile material having an entrance side;

drilling a hole in the ductile material with the split-point drill at a constant feedrate from the entrance side to an exit side thereof;

breaking through a surface of the exit side with the split-point drill a first predetermined distance to form a drill cap;

retracting the split-point drill a second predetermined distance;

accelerating the split-point drill through the surface of the exit side to remove the drill cap from the ductile material; and retracting the split-point drill from the ductile material.

7. A method as set forth in claim 6 wherein said step of breaking comprises partially breaking through the surface of the exit side with a drill point of the split-point drill approximately 0.010 inches.

8. A method as set forth in claim 6 wherein said step of retracting comprises retracting the splitpoint drill approximately 0.010 inches.

9. A method of drilling ductile materials with split-point drills, said method comprising the steps of:

placing a split-point drill above a ductile material having an entrance side;

drilling a hole in the ductile material with the split-point drill at a constant feedrate from the entrance side to an exit side thereof;

partially breaking through a surface of the exit side with a drill point of the split-point drill approximately 0.010 inches to form a drill cap;

retracting the split-point drill approximately 0.010 inches;

accelerating the split-point drill through the surface of the exit side to remove the drill cap from the ductile material; and retracting the split-point drill from the ductile material.

\* \* \* \* \*